DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 10

T922,006

METHOD FOR PREPARING FIRE RETARDANT POLYESTER FIBERS

Winston J. Jackson, Jr., 4408 Greensprings Circle 37664, and John R. Caldwell, 404 Colonial Heights 37663, both of Kingsport, Tenn.

Filed Mar. 30, 1973, Ser. No. 346,511

Int. Cl. C09d *5/18;* C09k *3/28*

U.S. Cl. 117—136

No Drawing. 12 Pages Specification

Disclosed is a process for preparing fire retardant polyester fibers comprising applying to the surface of the polyester fiber an organic bromine compound, and subsequently heating the fiber in a temperature range of about 160° to about 220° C. to diffuse into the fiber structure a sufficient quantity of the organic bromine compound to result in, based on the weight of the fiber, 0.3 to 3 weight percent bromine in the fiber structure. Poly(ethylene terephthalate) and poly(1,4-cyclohexylenedimethylene terephthalate) fibers are particularly desirable polyester fibers. Tris(2,3-dibromopropyl) phosphate is a particularly desirable organic bromine compound.